(12) United States Patent
Nakagawa et al.

(10) Patent No.: US 6,349,218 B1
(45) Date of Patent: Feb. 19, 2002

(54) ADAPTIVE ARRAY ANTENNA SYSTEM AND MOBILE TELECOMMUNICATIONS SYSTEM USING THE SAME

(75) Inventors: Youichi Nakagawa, Tokyo; Takashi Fukagawa, Kawasaki; Makoto Hasegawa, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/234,440

(22) Filed: Jan. 21, 1999

(30) Foreign Application Priority Data

Jan. 22, 1998 (JP) ............................. 10-010218

(51) Int. Cl.[7] ...................... H04B 1/38; H04B 7/10; H04Q 7/20; H01Q 3/22; G01S 5/02
(52) U.S. Cl. ..................... 455/562; 455/456; 342/368; 342/417; 375/347
(58) Field of Search ................... 455/456, 457, 455/562, 561, 507, 517, 525, 524; 342/367, 368, 370, 371, 372, 373, 417, 428, 429, 430, 433, 434, 437–439, 443–445, 446, 450, 463–465; 375/347, 148

(56) References Cited

U.S. PATENT DOCUMENTS

| | | | |
|---|---|---|---|
| 5,262,789 A | * 11/1993 | Silverstein | 342/368 |
| 5,566,209 A | 10/1996 | Forssen et al. | 375/262 |
| 6,008,759 A | * 12/1999 | Tangemann et al. | 342/368 |
| 6,084,928 A | * 7/2000 | Kuwahara | 375/347 |
| 6,188,913 B1 | * 2/2001 | Fukagawa et al. | 455/562 |
| 6,225,948 B1 | * 5/2001 | Baier et al. | 342/417 |

FOREIGN PATENT DOCUMENTS

| | | |
|---|---|---|
| EP | 0 353 759 A | 2/1990 |
| EP | 0 865 099 | 9/1998 |
| JP | 5-41607 | 2/1993 |
| JP | 09-200115 | 11/1997 |

\* cited by examiner

*Primary Examiner*—Tracy Legree
(74) *Attorney, Agent, or Firm*—Connolly Bove Lodge & Hutz LLP (57) ABSTRACT

The direction-of arrival estimation by means of a subspace-based algorithm such as MUSIC or ESPRIT is formed by using reduced-bandwidth signals as compared with communication signal waves. The narrower-bandwidth signals is obtained by each mobile telephone transmitting a modulated version of a lower-transmission rate test signal as well as a communication signal wave or by band-pass filtering the received communication signal waves in a base station. A direction-of-arrival estimation is formed by using a reduced number of signals for the direction-of arrival estimation. The number of direction-of-arrival estimating signals is reduced by discarding a part of the received signals, by multiplexing the received signals by the sub-array and forming a direction-of arrival estimation for each sub-array, or by using an additional array antenna having a reduced number of elements.

8 Claims, 11 Drawing Sheets

ADAPTIVE ARRAY ANTENNA SYSTEM AND MOBILE TELECOMMUNICATIONS SYSTEM USING THE SAME

BACKGROUND OF THE INVENTION

1. Field of the Invention

The invention generally relates to wireless-access telecommunications systems such as mobile telephone, interactive pager, commercial-use radio communications systems, etc. and more particularly to adaptive array antenna systems used in such mobile radio communications systems.

2. Description of the Prior Art

An illustrative example of wireless-access telecommunications systems is cellular or mobile radio-telephone systems. In mobile telephone systems, frequency-division multiple access (FDMA) is used to maximize capacity by splitting available bandwidth into separate channels, which are assigned to respective cell zones. In each cell zone (or each radio channel), time-division multiple access (TDMA) is used to expand the channel capacity by permitting the base station (or radio cell) of the cell zone to serve a plurality of radio-telephones within the cell zone. An alternative capacity-expanding technique, known as code-division multiple access (CDMA) has been proposed to further expand capacity. CDMA allows reuse of the same radio-frequency spectrum in adjacent cells by the adjacent cells using codes noncorrelating with each other for spread spectrum modulation.

Since base stations typically uses adaptive array antenna, studies on directivity control techniques for the adaptive array antenna have been made as one of disturbance wave elimination techniques. In conventional antenna directivity control techniques for the adaptive antenna array, the directivity of an array antenna of a base station is controlled by directing the peak of the directivity to the direction of arrival or the location of a signal source (i.e., a mobile station) associated with the current time slot and by directing a null point of the directivity to the direction of an incoming disturbance wave. Some subspace-based algorithms, which involve covariance eigen-analysis, have been proposed as the direction-of-arrival estimation techniques used in directivity control. Two of such algorithms are well known as MUSIC (multiple signal classification) and ESPRIT (estimation of signal parameters via rotational invariance techniques).

The present invention relates to an array antenna directivity control method and system based on such a subspace-based algorithm and to a radio communications system incorporating the same.

However, in order to enable higher rate data transmissions such as image data transmission, the directivity of array antenna has to be controlled with a higher precision than conventional directivity control techniques can achieve. For this purpose, the sensitivity of reception of signals used in a direction-of-arrival estimator has to be raised.

It is therefore an object of the invention to provide a method of and a system for controlling directivity of an array antenna with a raised precision thereby to enable a higher rate data transmission.

The elements of array have to be increased in number with a growth in the number of mobile radio-telephones. This involves not only an increase in the area of the array but also an increase in processing time for the direction-of-arrival estimation, which makes real-time directivity control difficult.

It is another object of the invention to provide a method of and a system for controlling directivity of an array antenna having an increased number of elements or sensors in real time thereby to enable service to a larger number of mobile radio-telephones.

SUMMARY OF THE INVENTION

According to one aspect of the invention, the direction-of arrival estimation by means of a subspace-based algorithm such as MUSIC (multiple signal classification) or ESPRIT (estimation of signal parameters via rotational invariance techniques) is formed by using signals the bandwidths of which are narrower than those of communication signal waves (hereinafter, expressions like "an XX signal wave" are used to mean "an RF carrier-modulated version of an XX signal). The narrower-bandwidth signals may be obtained by each mobile telephone transmitting a modulated version of a lower-transmission rate test (or estimation) signal as well as a communication signal wave or by band-pass filtering the received communication signal waves in a base station.

Using narrower-bandwidth signals causes the noise bandwidth to be the narrower, the correlation between the received signals to be reduced and the influence of changes in the characteristics of transmission path due to, e.g., fading to be reduced. This enables a higher-precision direction-of-arrival estimation, causing the array antenna to have a sharp directivity and resulting in raised sensitivities of both the base station and the mobile stations.

According to another aspect of the invention, the direction-of-arrival estimation by means of a subspace-based algorithm is formed by using a reduced number of received signals for the direction-of arrival estimation. The number of direction-of-arrival estimating signals is reduced by discarding a part of the received signals, by reducing the number of signals processed at a time (i.e., multiplexing the received signals by the sub-array and forming a direction-of arrival estimation for each sub-array, or by using an additional array antenna which has a reduced number of elements and is dedicated for the direction-of arrival estimation.

Using a reduced number of signals for the direction-of-arrival estimation enables a real-time direction-of-arrival estimation.

The first aspect and the second aspect of the invention are preferably used in combination. Doing this enables the directivity control of an array antenna to be achieved with a raised precision in real time. Accordingly, the sensitivities of both the base station and the mobile telephones are so enhanced that a large amount of data can be transmitted at a high speed as required in image data transmission.

BRIEF DESCRIPTION OF THE DRAWING

The features and advantages of the present invention win be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Embodiment I

Figure 1:
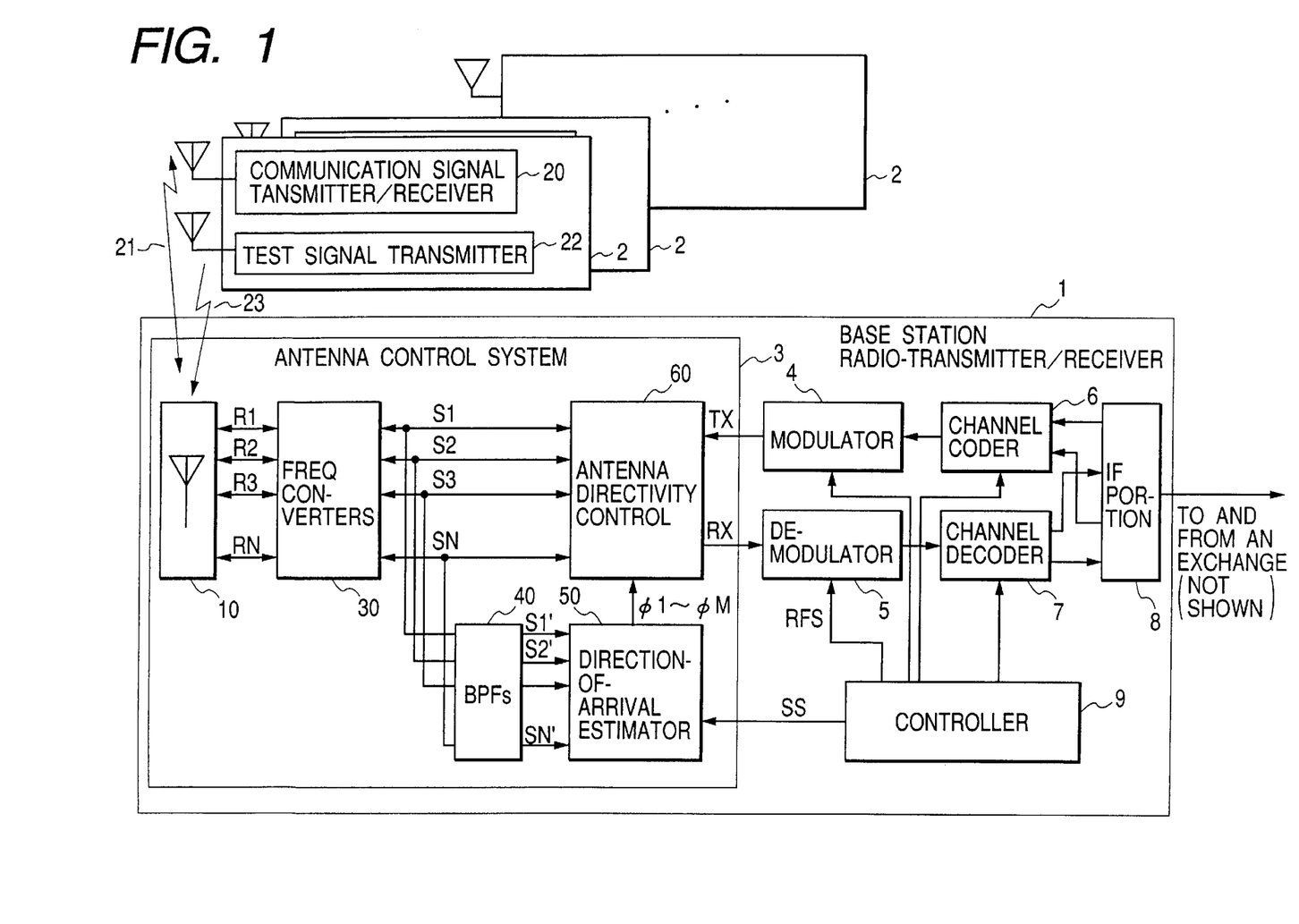
FIG. 1 is a schematic diagram showing an exemplary arrangement of a mobile radio-telephone system that incorporates an antenna control system according to an illustrative embodiment of the invention.

FIG. 1 is a schematic block diagram showing an arrangement of a first illustrative embodiment of a mobile radio-telephone system in which the directivity of array antenna is controlled by the direction-of-arrival estimation based on a subspace-based algorithm such as MUSIC or ESPRIT in accordance with one aspect of the invention. In FIG. 1, the mobile telephone system comprises a base station radio-transmitter/receiver 1 and a plurality of mobile stations or telephones 2 located within a service area of the base station 1.

Figure 2:
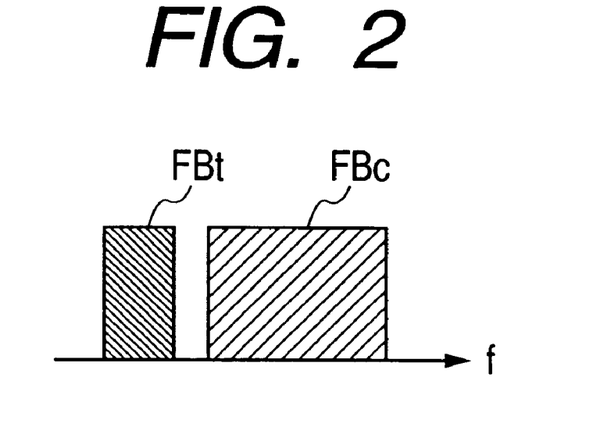
FIG. 2 is a diagram showing frequency bands of the communication signal wave and the test signal wave transmitted by a mobile telephone in accordance with a first aspect of the invention.

A mobile radio-telephone 2 comprises a communication signal transmitter/receiver 20 which serves as a conventional mobile radio-telephone for transmitting and receiving communication signal waves 21 and a test signal transmitter 22 for transmitting a test signal wave 23 for use in the direction-of-arrival estimation. Since the transmission rate of a test signal is set lower than that of the communication signal, the bandwidth of the test signal wave 23, FBt, is narrower than that of the communication signal waves 21, FBc, as shown in FIG. 2.

The base station radio-transmitter/receiver 1 comprises an array antenna 10 having a plurality (N) of array elements (i.e., sensors or antennas); the same number (N) of frequency converters 30 having their radio side terminals connected with respective array elements; the same number (N) of band pass filters (BPF) 40 having their input connected with respective outputs of the frequency converters 30; a direction-of-arrival estimator 50 having its inputs connected with the outputs of the BPF 40 for providing estimated angles of the directions of arrival, $\phi 1, \phi 2, \ldots, \phi M$; and an antenna directivity controller 60 connected with the frequency converter 30 RF side terminals and the direction-of-arrival estimator 50 output. The above described portion of the base station radio-transmitter/receiver 1, which transmits and receives respective base band (or IF: intermediate frequency) signals, is hereinafter referred to as "an antenna control system 3."

It should be noted that it has been assumed in the just above paragraph that M telephone terminals 2 are actually and currently communicating with the base station 1. This assumption is applied also in the following description.

The radio-transmitter/receiver 1 further comprises a modulator 4 having its output connected with a transmission signal (TX) input terminal of the antenna directivity controller 60; a modulator 5 having its input connected with a received signal (RX) output terminal of the antenna directivity controller 60; a TDMA channel coder 6 having its output connected with a modulator 4 input; a TDMA channel decoder 7 having its input connected with a demodulator 5 output; an interface portion 8 having, on its radio side, its speech and control outputs connected with two channel coder 6 inputs and its speech and control inputs connected with two channel decoder 7 outputs and having its telephone side connected with an exchange (not shown); and a controller 9 for controlling the operation of the base station 1 by generating various control signals such as a transmission (i.e., down-link) frame sync (TFS) signal, a reception (i.e., up-link) frame sync (RFS) signal and a slot sync (SS) signal to the channel coder 6, the channel decoder 7 and the direction-of-arrival estimator 50, respectively.

Figure 3:
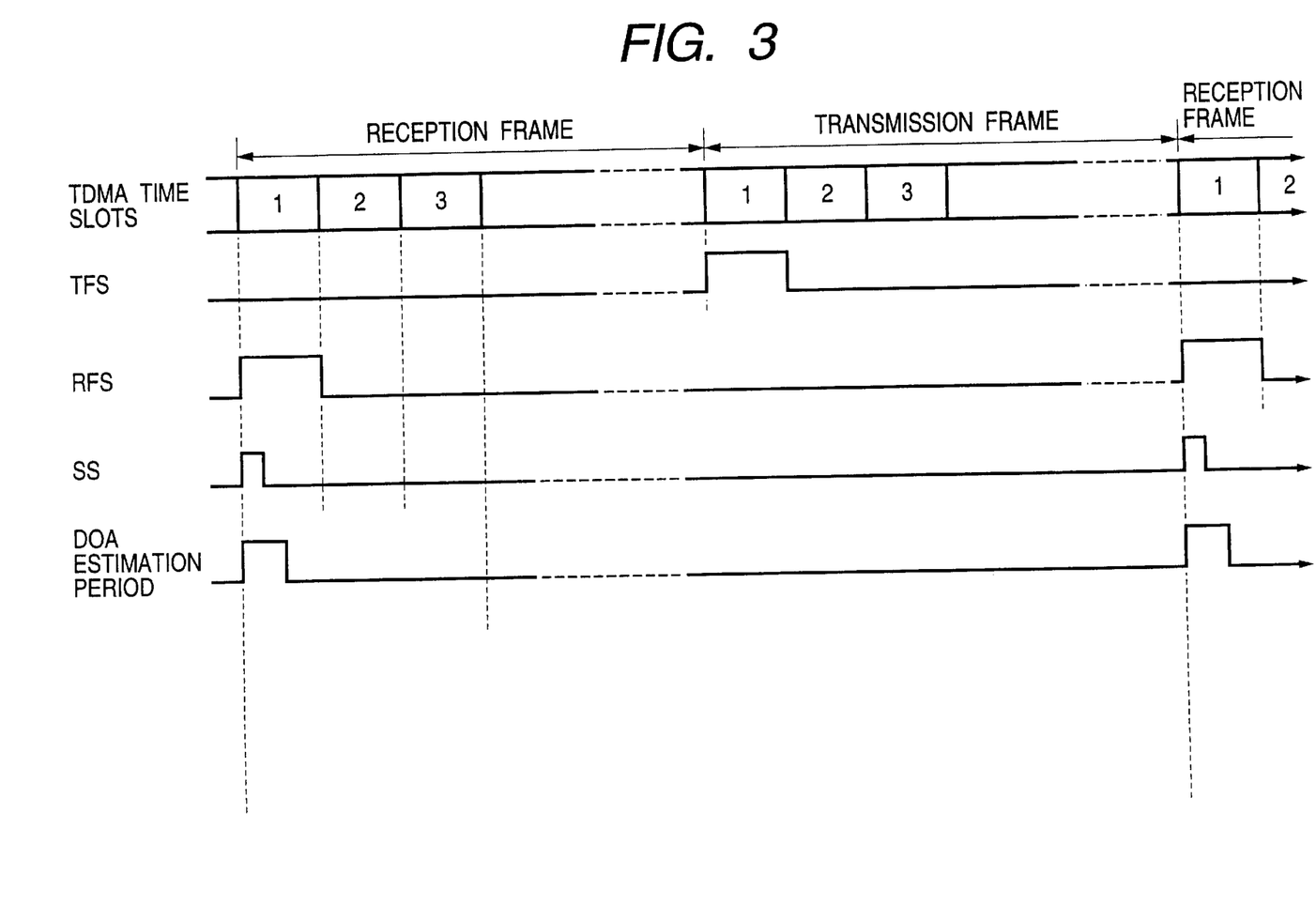
FIG. 3 is a timing chart showing the timing of TFS, RFS and SS signals used in the base station 1.

FIG. 3 is a timing chart showing the timing of exemplary TFS, RFS and SS signals used in the base station 1. In FIG. 3, TDMA TIME SLOTS indicates time slots assigned to the mobile telephones 2 currently communicating with the base station 1. TFS is a wave-form of the TFS signal indicative of the beginning of each transmission frame. RFS is a wave-form of the RFS signal indicative of the beginning of each reception frame. SS is a wave-form of the SS signal indicative of the beginning of each of the slots in which the direction-of-arrival (DOA) estimation operation is executed, e.g., the first slot of each reception frame. DOA ESTIMATION PERIOD indicates periods during which the DOA estimation operation is executed. As seen from FIG. 3, the DOA estimation is formed in the first slot of each reception frame in this specific embodiment.

In a direction-of-arrival estimation operation (executed in the first slot of each reception frame), the N elements of the array antenna 10 receives the communication signal wave 21 and the test signal wave 23 and supplies received radio waves as R1, R2, ..., RN to respective frequency converters 30. The frequency converters 30 converts the received signals R1, R2, ..., RN into respective IF signals or base band signals S1, S2, ..., SN, which is supplied to the BPFs 40 and the antenna directivity controller 60. It is assumed that the pass band of the BPFs 40 is so set as to only pass the test signal for the DOA estimation. Then, the BPFs 40 passes only test signals S1', S2', ..., SN' to the direction-of-arrival estimator 50. Responsively, the direction-of-arrival estimator 50 estimates the directions-of-arrival on the basis of any suitable subspace-based algorithm in which a covariance matrix is calculated for the test signals S1', S2', ..., SN' and the eigenvectors for the covariance matrix is found. The direction-of-arrival estimator 50 supplies estimated angles (or direction-of-arrival (DOA) estimates) φ1, φ2, ..., φM for the M active mobile telephones 2 to the antenna directivity controller 60.

It is noted that the number (M) of active mobile telephones 2 should not exceed the number (N) of the elements of the array antenna 10, that is, M<N.

Since the test signal is lower in transmission rate than the communication signal, the bandwidth of the test signal wave is narrower than that of the communication signal waves, reducing the noise bandwidth accompanying the test signal wave and accordingly causing the signal to noise ratio of the signals S1', S2', ..., SN'. This enables the use of an array antenna 2 with array elements of wider directivity. The lowness of test signal transmission rate also causes the correlation between the received signals to be reduced and the influence of changes in the characteristics of transmission path due to, e.g., fading to be reduced. These enable the directions-of-arrival to be estimated with a raised precision, and enable the array antenna 10 of wider directivity array elements to have a sharp directivity.

On receiving the DOA estimates φ1, φ2, ..., φM, the antenna directivity controller 60 sets the signal processing parameters for each DOA estimates by adjusting the phase and the amplitude of the frequency converted reception signal RX such that the peak of the directivity of the array antenna 10 is directed to the DOA estimate. Thereafter, in each time slot, the antenna directivity controller 60 uses the signal processing parameters set for the DOA estimate φi of the mobile telephone 2 associated with (or using) the time slot.

The operation of elements 4 through 8 is well known and accordingly will not be described in detail.

Modification

Figure 4:
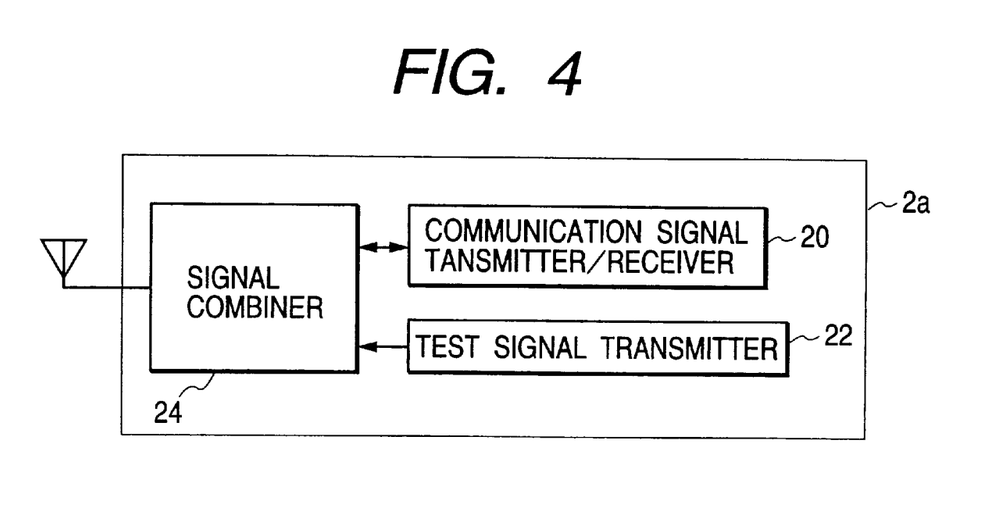
FIG. 4 is a schematic block diagram showing an arrangement of another mobile radio-telephone 2a usable in place of the radio-telephone 2 of FIG. 1.

FIG. 4 is a schematic block diagram showing an arrangement of another mobile radio-telephone 2a usable in place of the radio-telephone 2 of FIG. 1. As shown in FIG. 4, the communication signal wave and the test signal wave may be combined together by a signal combiner 24 before transmission.

Embodiment II

In a second illustrative embodiment, the low-transmission-rate test signal for use in the DOA estimation is transmitted in a predetermined time slot, say, the first time slot of each reception (or up-link) frame. In this case, the test signal is modulated with the same carrier as used for the modulation of the communication signal. The frequency band of the test signal wave in this case appears within that of the communication signal wave as shown in FIG. 5.

Figure 6:
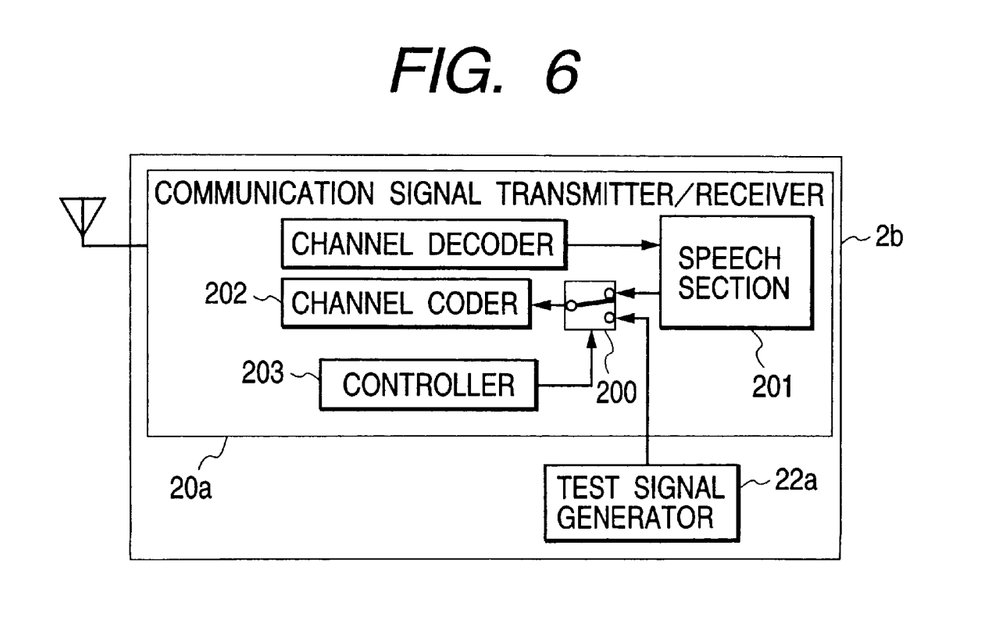
FIG. 6 is a schematic block diagram showing an exemplary arrangement of a mobile radio-telephone 2b used in the second illustrative embodiment.

FIG. 6 is a schematic block diagram showing an exemplary arrangement of a mobile radio-telephone 2b used in the second illustrative embodiment of a mobile radio-telephone system according to the invention. In FIG. 6, the radio-telephone 2b comprises a radio-telephone transmitter/receiver 20a and a test signal generator 22a for generating a test signal of a low transmission rate. The transmitter/receiver 20a further includes a signal selector 200 for selectively coupling one of the test signal from the test signal generator 22a and a speech signal output from a speech section 201 with an input terminal of a channel coder 202 under the control of a controller 203.

Figure 5:
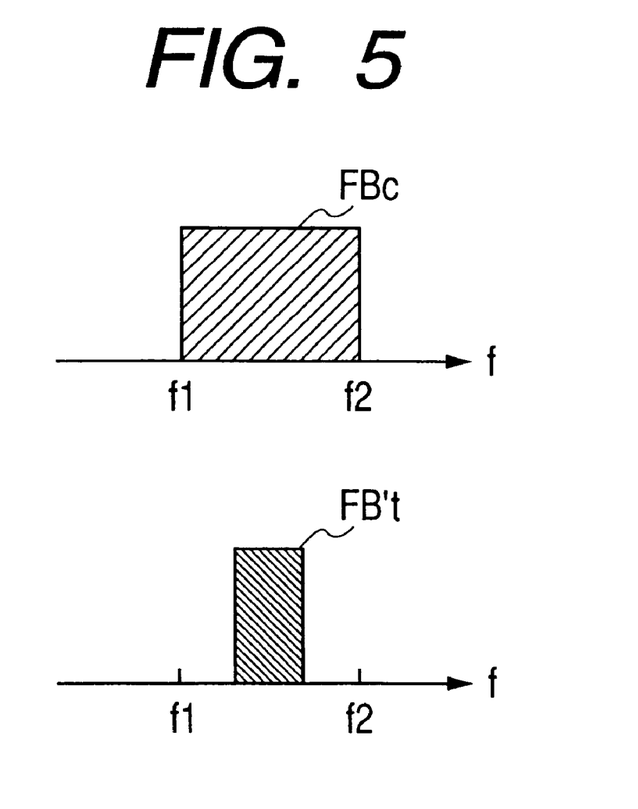
FIG. 5 is a diagram showing frequency bands of the communication signal wave and the test signal wave transmitted by a mobile telephone in accordance with a second illustrative embodiment of the invention.

The arrangement of the base station radio-transmitter/receiver 1 of this embodiment is identical to that of the first embodiment except that the pass band of the BPFs 40 is set to the frequency band FBt' as shown in FIG. 5.

Embodiment III

Figure 7:
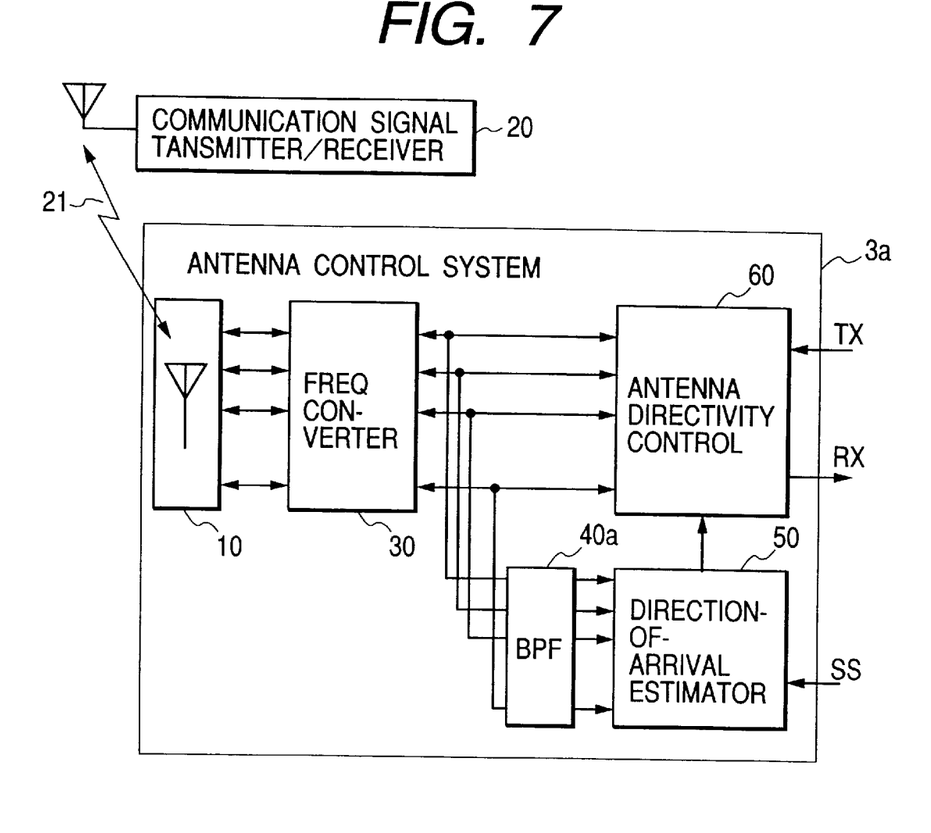
FIG. 7 is a schematic diagram showing a part of an exemplary arrangement of a mobile radio-telephone system that incorporates an antenna control system according to a third illustrative embodiment of the invention.

FIG. 7 is a schematic diagram showing a part of an exemplary arrangement of a mobile radio-telephone system that incorporates an antenna control system 3a according to a third illustrative embodiment of the invention. The mobile telephone system of FIG. 7 is identical to that of FIG. 1 except that the mobile telephone 2 has been replaced with the mobile telephone transmitter/receiver 20 and the BPFs 40 have been replaced with BPFs 40a.

Figure 8:
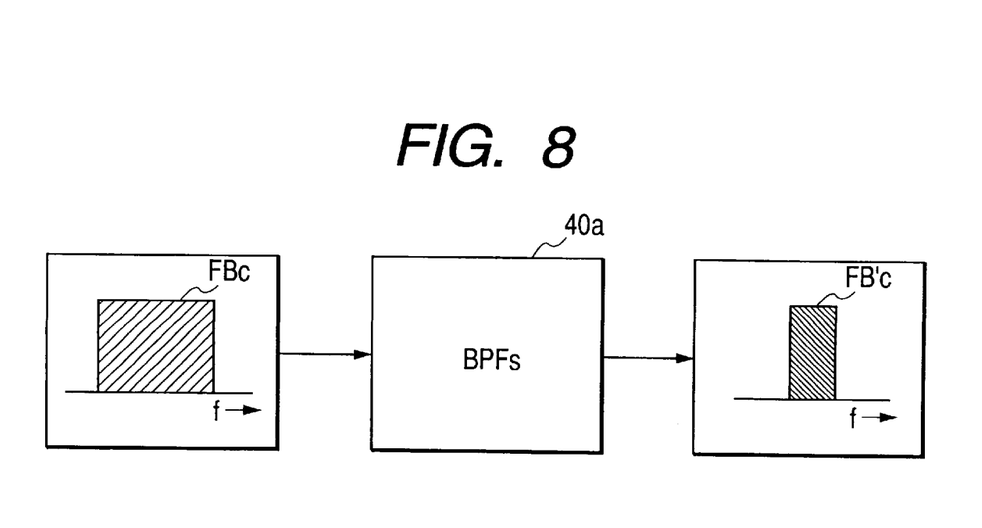
FIG. 8 is a diagram showing input/output characteristics of the BPFs 40a according to the principles of the invention.

Specifically, the transmitter/receiver 20 is a conventional mobile radio-telephone. FIG. 8 is a diagram showing input/output characteristics of the BPFs 40a according to the principles of the invention. In FIG. 8, the frequency band FBc is those of the input signals to the BPFs 40a, and the frequency band FBc' is those of the output signals of the BPFs 40a (which is identical to the frequency band FBt' of FIG. 5). In this way, this specific embodiment enables the DOA estimation using-reduced bandwidth signals.

Embodiment IV

Figure 9:
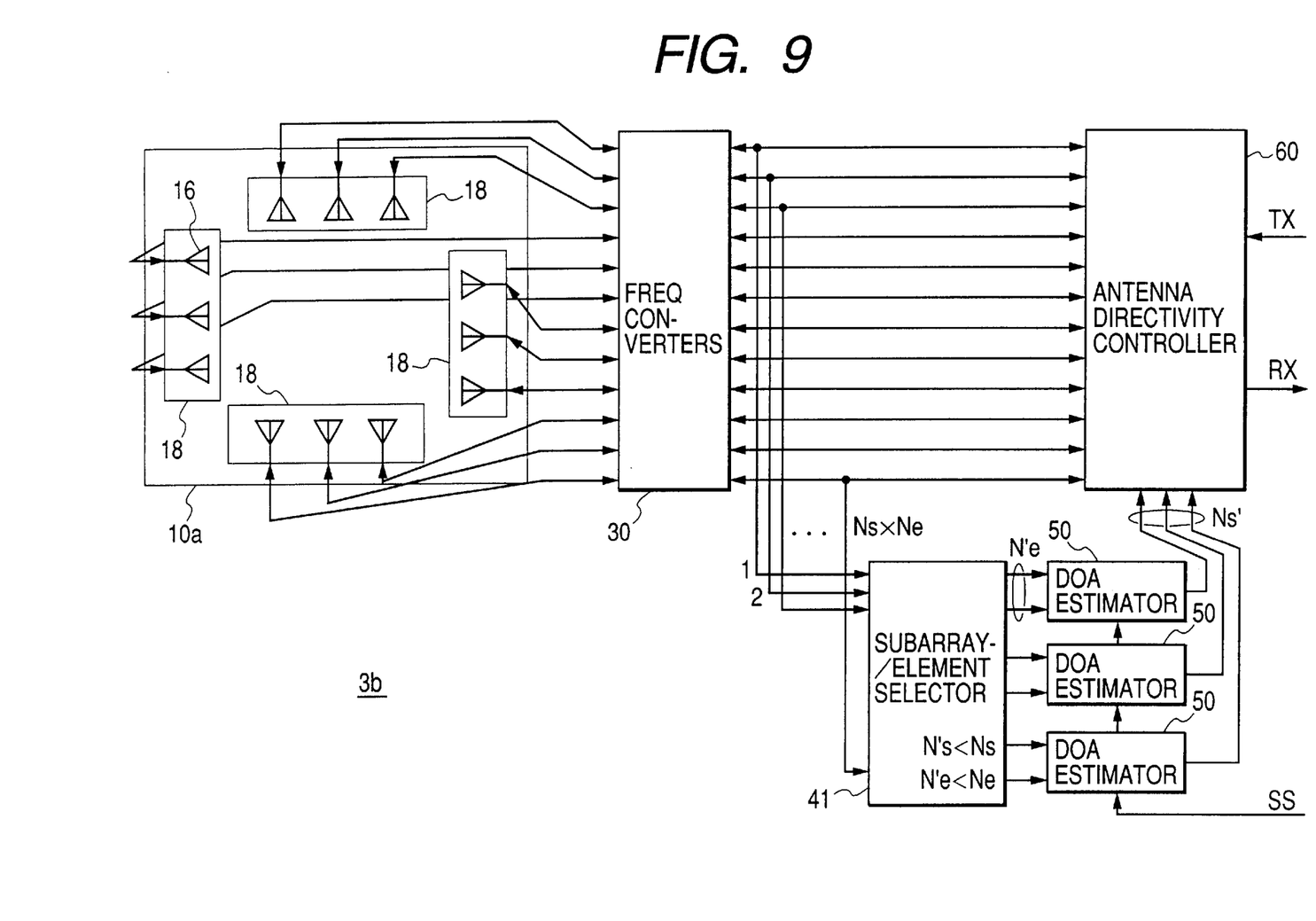
FIG. 9 is a schematic diagram showing an exemplary arrangement of an antenna control system in which the direction-of-arrival estimation is formed by using a reduced number of signals for the direction-of arrival estimation in accordance with a fourth illustrative embodiment of the invention.

FIG. 9 is a schematic diagram showing an exemplary arrangement of an antenna control system 3b in which the direction-of-arrival estimation is formed by using a reduced number of signals for the direction-of arrival estimation in accordance with a fourth illustrative embodiment of the invention. The antenna control system 3b of FIG. 9 is identical to that of FIG. 1 except that the array antenna 10, the BPFs 40, and a single DOA estimator 50 have been replaced with an array antenna 10a, a subarray/element selector 41, and a plurality (3 in this specific example) of DOA estimators 50.

In this and the following embodiments, it is assumed that the array antenna 10a includes a plurality (Ns) of subarrays 18 (4 subarrays in this example), each of which further includes a plurality (Ne) of elements or antennas 16 (3 antennas in this specific example).

In DOA estimation operation, the Ns×Ne signals from the elements 16 of the array antenna 10a are converted by the frequency converters 30 into Ns×Ne base band or IF signals. The subarray/element selector 41 selects Ns'×Ne' signals from the Ns×Ne base band or IF signals, where Ns'<Ns and Ne'<Ne. In this case, the selector 41 selects 3 subarrays from the four subarrays 18 and then two elements from the three elements 16 of each of the selected subarrays 18. Each of the Ns DOA estimators 50 forms the DOA estimation by using the selected elements 16 of a selected subarray 18.

Further, in this specific embodiment, the number of the DOA estimators 50 is preferably equals the number of selected subarrays, i.e., Ns' (3 in this example).

Using a reduced number of signals for the DOA estimation reduces the processing time for the DOA estimation.

Modification

Figure 10:
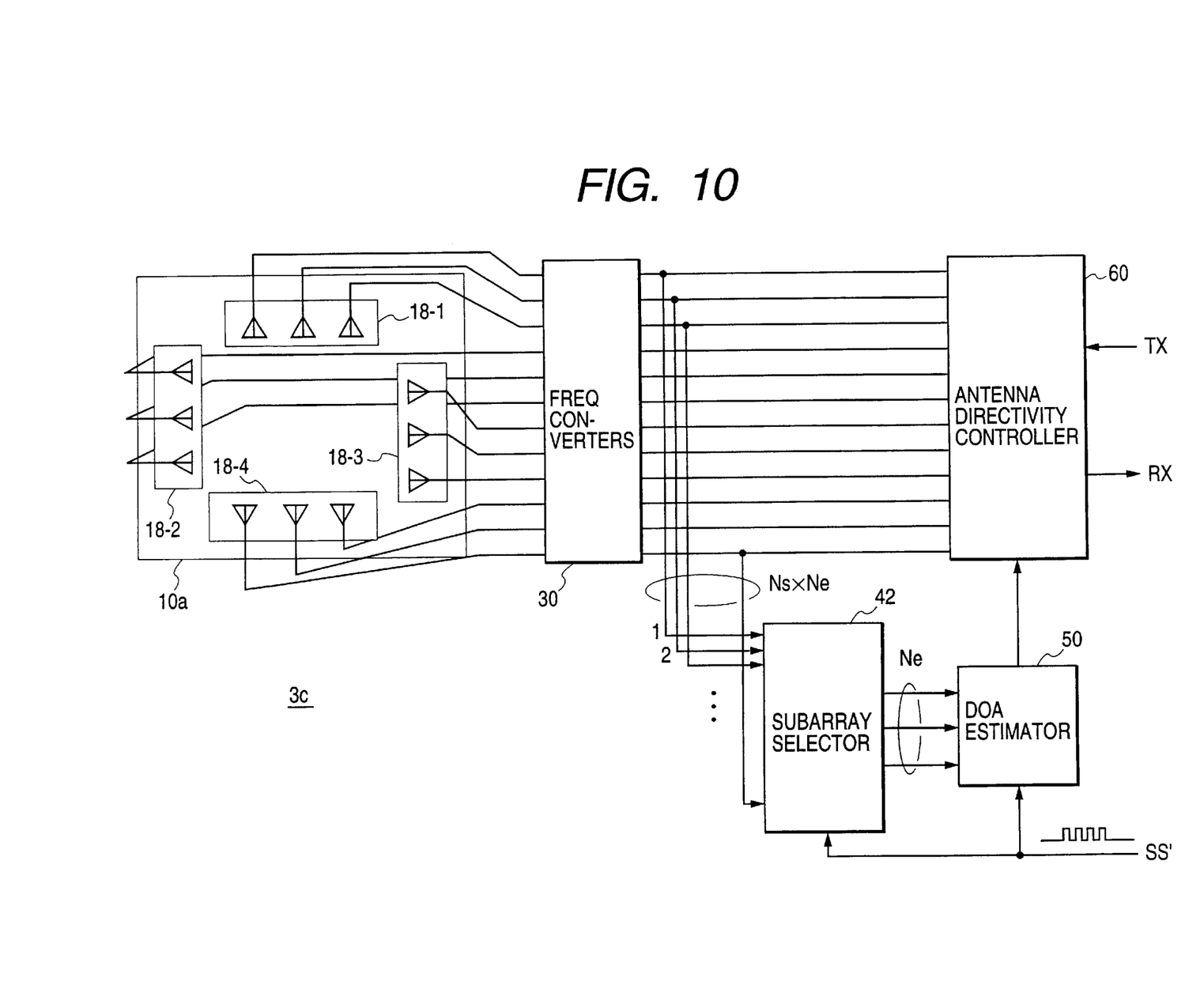
FIG. 10 is a schematic diagram showing an exemplary arrangement of an antenna control system 3c according to a modification of the fourth illustrative embodiment of the invention.

FIG. 10 is a schematic diagram showing an exemplary arrangement of an antenna control system 3c according to a modification of the fourth illustrative embodiment of the invention. In FIG. 10, the antenna control system 3c is identical to that of FIG. 9 except that the subarray/element selector 41 has been replaced with a subarray selector 42 and the Ns DOA estimators 50 have been replaced with a single DOA estimator 50.

In DOA estimation operation executed in the first time slot of each reception frame, the controller 9 outputs Ns pulses (4 pulses in this example) as a slot sync signal SS' at such an interval as enables the DOA estimator 50 to form an DOA estimation by using a subarray's worth of signals. Responsively, the Ns-by-Ne (i.e., Ns sets of Ne) frequency-converted base band signals are selected by the subarray selector 42 and output in four times. In other words, Ne signals of a selected subarray is passed at a time to the DOA estimator 50 in response to each of Ns pulses of the SS' signal. In response to each SS' pulse, the DOA estimator 50 uses the received Ne signals for the DOA estimation.

This arrangement reduces the complexity of the antenna control system 3c. Though the reduced number of signals is used for the DOA estimation, the full Ns-by-Ne base band signals are used for actual communications. This enables the array antenna 10a to have a sharp directivity, permitting power-saved communications without influencing on other base stations or other ones than the mobile telephone with which the base station incorporating the antenna control system 3c is currently communicating.

Embodiment V

Figure 11:
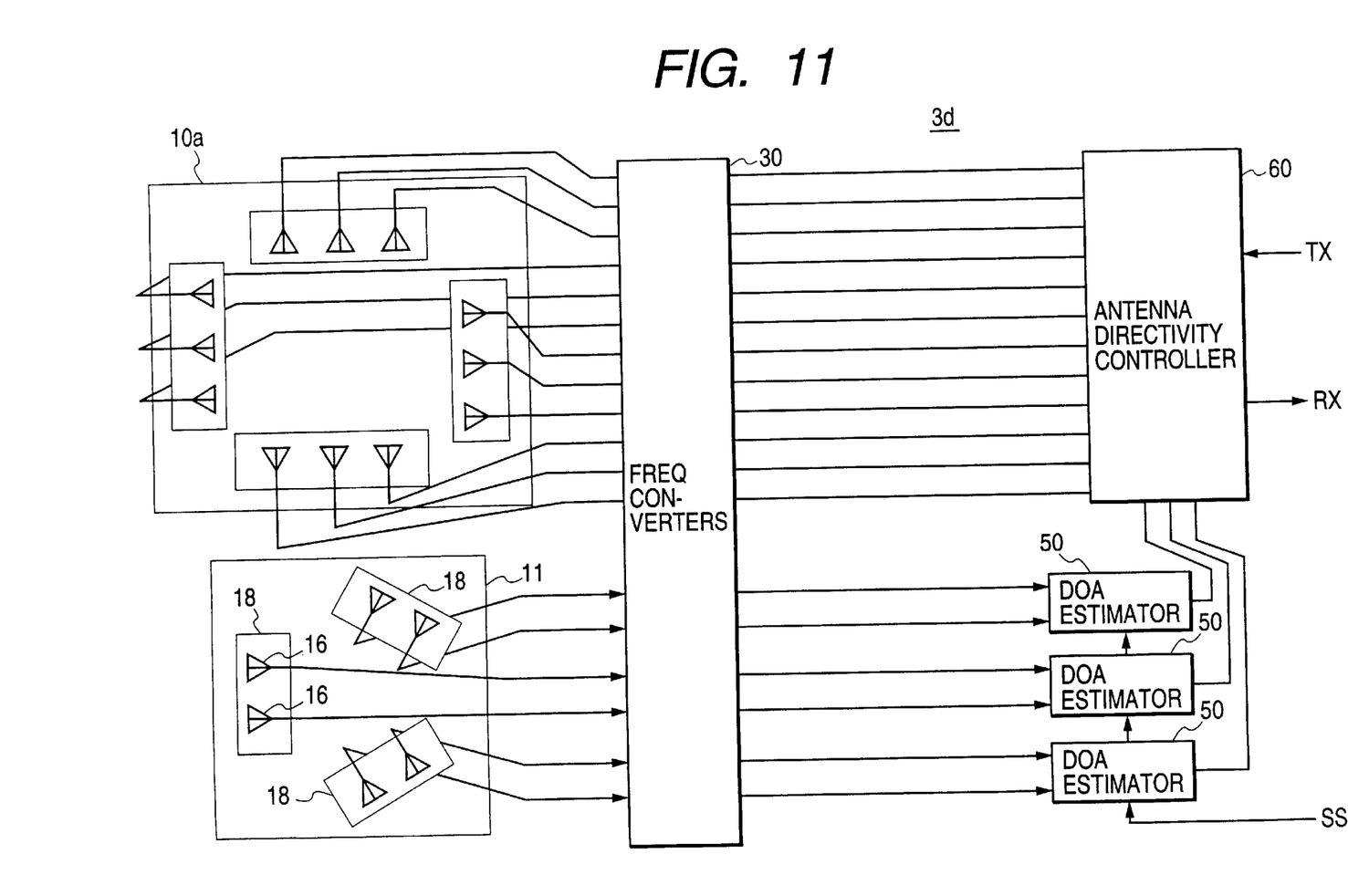
FIG. 11 is a schematic diagram showing an exemplary arrangement of an antenna control system provided with an array antenna dedicated to the direction-of-arrival estimation in accordance with a fifth illustrative embodiment of the invention.
Figure 12:
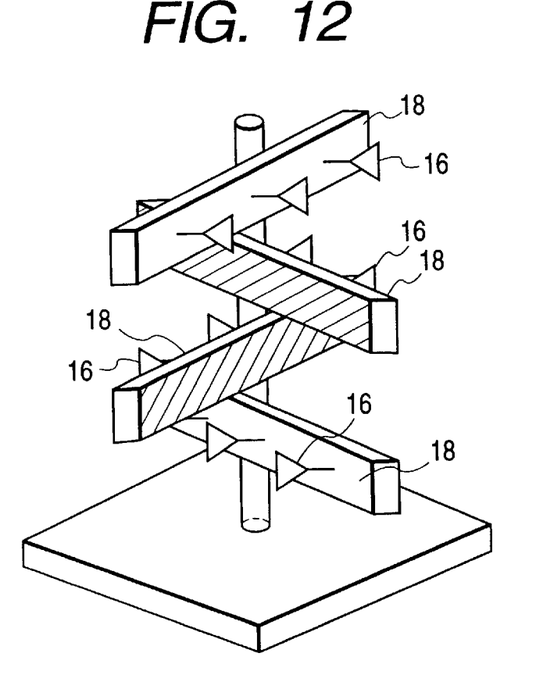
FIGS. 12 through 15 are illustrations showing exemplary arrangements of various array antennas that can be used as the array antennas 10, 10a and 11.

FIG. 11 is a schematic diagram showing an exemplary arrangement of an antenna control system 3d provided with an array antenna dedicated to the direction-of-arrival estimation in accordance with a fifth illustrative embodiment of the invention. In FIG. 11, the antenna control system 3d is identical to that of FIG. 9 except that the input signals to each DOA estimator 50 is supplied from the Ne' elements 16 of one of the Ns' subarray 28 of an additional array antenna 11 through the frequency converters 30 instead of using the subarray/element selector 41. This embodiment has almost the same advantages as that of FIG. 9 has.

Modifications

Figure 16:
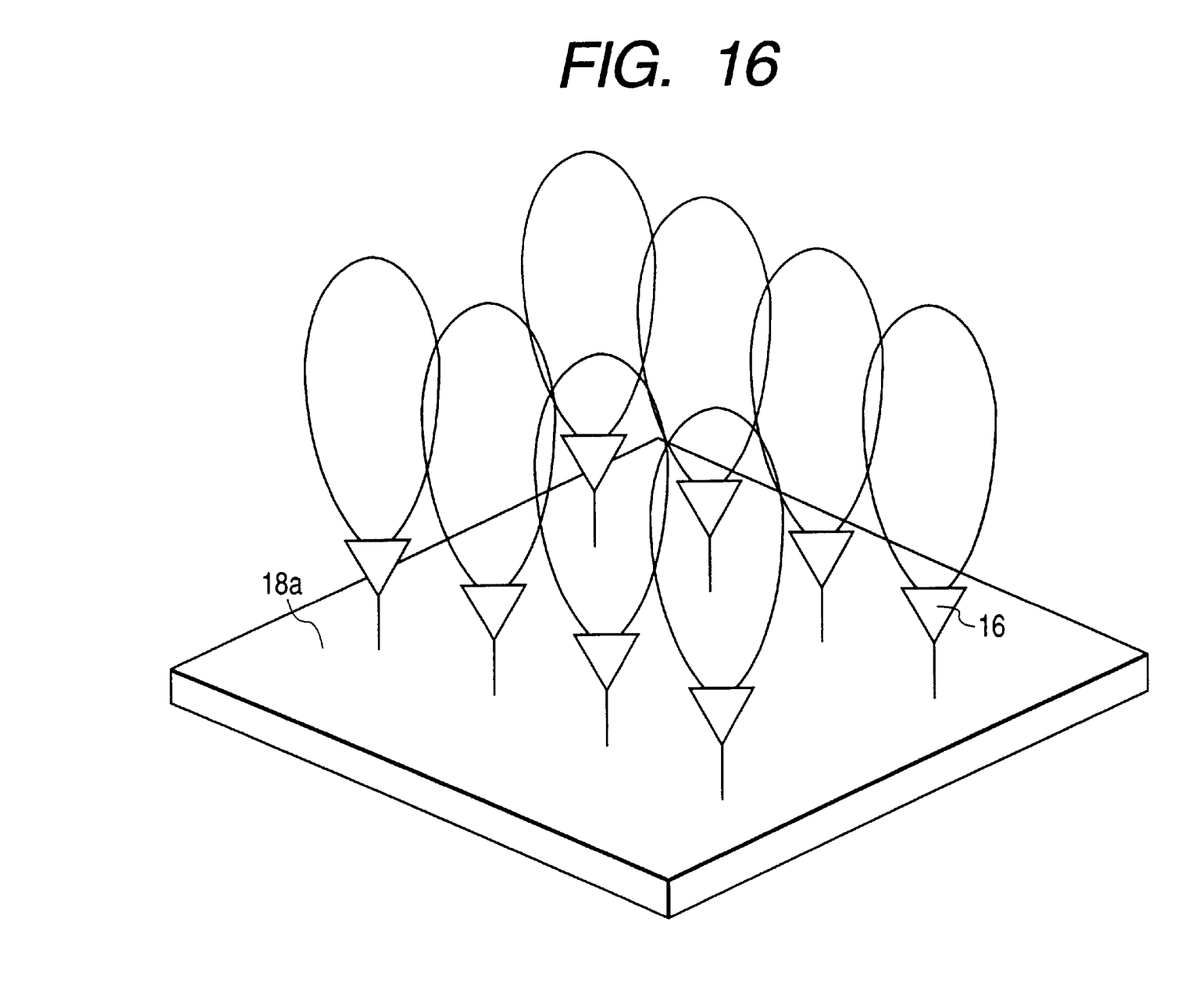
FIG. 16 is an illustration showing an exemplary arrangement of a surface of a two-dimensionally arranged subarray antenna that can be used for the array antennas of FIGS. 12 through 15.

FIGS. 12 through 15 are illustrations showing exemplary arrangements of various array antennas that can be used as the array antennas 10, 10a and 11. FIG. 16 is an illustration showing an exemplary arrangement of a surface of a two-dimensionally arranged subarray antenna that can be used for the array antennas of FIGS. 12 through 15.

Figure 14:
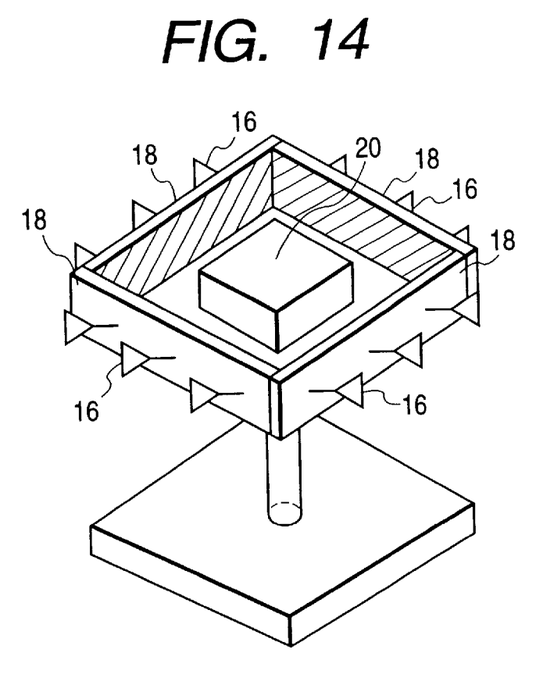
Figure 15:
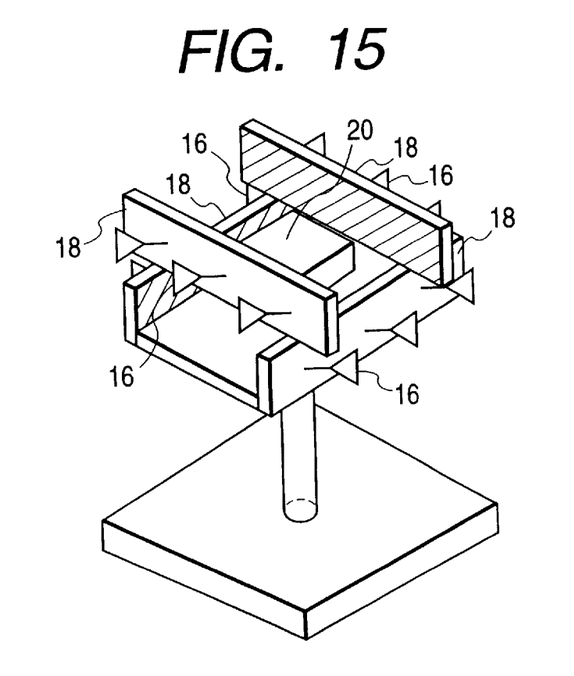

Array antennas 10, 10a and 10 may be fabricated in any of the following ways—(a) arranging Ns subarrays in a Ns polygon with a center of a subarray fixing pole fixed substantially perpendicular to the horizon in a manner like FIG. 14; (b) attaching Ns subarrays to the subarray fixing pole in Ns layers along the pole such that the Ns subarrays face in directions different by 360/Ns degrees in a manner like FIG. 12; (c) stacking subarray pairs with subarrays of each pair apart from each other and facing its surface outside such that the subarray fixing pole fixed substantially perpendicular to the horizon runs between each of the array pairs facing in directions different by the same angle in a manner like FIG. 15.

Figure 13:
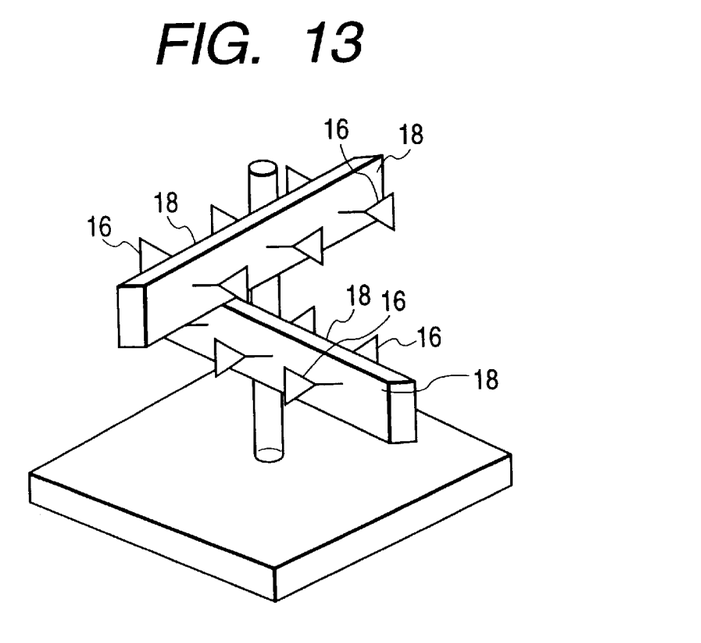

In the subarray arranging method (b), each subarray may be such that both of the sides of the subarray have array elements attached as shown in FIG. 13. In the subarray arranging method (a) and (c), a signal-processing unit may be disposed in a space enclosed by subarrays in manners like FIGS. 14 and 15. Though array elements have been arranged in a line on a strip of subarray, array elements may be arranged two dimensionally on a plane subarray 18a in a manner like FIG. 16.

It is also possible to enhance the estimation precision of the DOA estimator 50 with respect to radio waves impinging substantially perpendicularly on the surface of a subarray 18 by using, as array elements 6, elements or antenna that have such a sharp directivity in the front direction of the subarray 18 including the elements as shown in a directivity pattern of FIG. 16, i.e., array elements that are small in the half-directivity angle in a horizontal plane: e.g., Yagi antennas.

In the above description, it is assumed that it is desired to reduce the size and the weight of mobile radio telephones. However, if the base station 1 is intended to be mounted in a vehicle as in case of a TV relay broadcasting car, the arrangements of the base station 1 and the mobile station 2 may be reversed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method, for use in a base station, of finding direction-of-arrival estimates for second stations currently served by the base station, the method comprising the steps of:

obtaining low-transmission-rate signals from said second stations, said low-transmission-rate signals being lower in transmission-rate than communication signals used for communications between said base station and said second stations; and finding direction-of-arrival estimates by using said low-transmission-rate signals.

2. A method as defined in claim 1, wherein said obtaining step comprises the steps of:

receiving radio signals including modulated versions of test signals from said second stations, said test signals being lower in transmission rate than said communication signals; and converting said radio signal into IF signals; and filtering said IF signals to extract said test signals.

3. A method as defined in claim 1, wherein said obtaining step comprises the steps of:

receiving, from said second stations, time-division multiplexed radio signals comprising modulated versions of test signals and modulated communication signals, said test signals being lower in transmission rate than said communication signals; and converting time-division multiplexed IF signals comprising said test signals and said communication signs, and wherein the method further includes the step of activating said finding step in a time slot in which said test signals are transmitted.

4. A method as defined in claim 1, wherein said obtaining step comprises the steps of:

receiving modulated versions of said communication signals from said second stations; and converting said modulated versions into IF signals; and extracting lower-transmission-rate components from said IF signals by filtering said IF signals with a band pass filter with a pass band narrower than a frequency of said communication signals.

5. A base station for providing radio-telephone service to a plurality of second stations, the base station including:

means for obtaining low-transmission-rate signals from said second stations, said low-transmission-rate signals being lower in transmission-rate than communication signals used for communications between said base station and said second stations; and means for finding direction-of-arrival estimates for said second stations currently served by the base station by using said low-transmission-rate signals.

6. A base station as defined in claim 5, wherein said obtaining means comprises:

means for receiving radio signals including modulated versions of test signals from said second stations, said test signals being lower in transmission rate than said communication signals; and means for converting said radio signal into IF signals; and means for filtering said IF signals to extract said test signals.

7. A base station as defined in claim 5, wherein said obtaining means comprises:
   means for receiving, from said second stations, time-division multiplexed radio signals comprising modulated versions of test signals and modulated communication signals, said test signals being lower in transmission rate than said communication signals; and
   means for converting time-division multiplexed IF signals comprising said test signals and said communication signals, and wherein the base station further includes means for activating said finding means in a time slot in which said test signals are transmitted.

8. A base station as defined in claim 5, wherein said obtaining means comprises:
   means for receiving modulated versions of said communication signals from said second stations; and
   means for converting said modulated versions into IF signals; and
   means for extracting lower-transmission-rate components from said IF signals by filtering said IF signals with a band pass filter with a pass band narrower than a frequency of said communication signals.

* * * * *